United States Patent
Yu et al.

(10) Patent No.: US 7,200,336 B2
(45) Date of Patent: Apr. 3, 2007

(54) MULTI-DATA-RATE OPTICAL TRANSCEIVER

(75) Inventors: Rangchen Yu, Santa Clara, CA (US); Yuanjun Huang, Chengdu Sichuan Province (CN); Mingshou He, Chengdu Sichuan Province (CN); Bin Wei, Chengdu Sichuan Province (CN); Jiang Tian, Chengdu Sichuan Province (CN)

(73) Assignee: Fiberxon, Inc., Santa Clara, CA (US)

( * ) Notice: Subject to any disclaimer, the term of this patent is extended or adjusted under 35 U.S.C. 154(b) by 0 days.

(21) Appl. No.: 11/257,627

(22) Filed: Oct. 25, 2005

(65) Prior Publication Data

US 2006/0034612 A1    Feb. 16, 2006

(51) Int. Cl.
H04B 10/00    (2006.01)

(52) U.S. Cl. ...................................... 398/135

(58) Field of Classification Search ........ 398/135–139, 398/140–172

See application file for complete search history.

(56) References Cited

U.S. PATENT DOCUMENTS

| | | | |
|---|---|---|---|
| 5,588,080 A | 12/1996 | Kawamura | |
| 6,371,663 B1 | 4/2002 | Kneier | |
| 6,483,625 B2 * | 11/2002 | Shimura et al. | ............... 398/95 |
| 6,687,635 B2 | 2/2004 | Horne | |
| 6,700,654 B2 | 3/2004 | Gerrish | |
| 6,741,622 B2 | 5/2004 | Otsuka | |
| 6,801,454 B2 | 10/2004 | Wang | |
| 6,809,300 B2 | 10/2004 | Wakui | |
| 2002/0093796 A1 | 7/2002 | Medina | |
| 2003/0027440 A1 | 2/2003 | Birch | |
| 2003/0044121 A1 | 3/2003 | Shang | |
| 2003/0049000 A1 | 3/2003 | Wu | |
| 2003/0072137 A1 | 4/2003 | Yen | |
| 2003/0072540 A1 | 4/2003 | Huang | |
| 2003/0156801 A1 | 8/2003 | Hwang | |
| 2003/0194190 A1 | 10/2003 | Huang | |
| 2003/0206403 A1 | 11/2003 | Zaremba | |
| 2003/0214789 A1 | 11/2003 | Medina | |
| 2004/0008954 A1 | 1/2004 | Shaw | |
| 2004/0029417 A1 | 2/2004 | Engel | |
| 2005/0213982 A1* | 9/2005 | Weber | ........................ 398/135 |

* cited by examiner

Primary Examiner—Jason Chan
Assistant Examiner—David Lee
(74) Attorney, Agent, or Firm—Xin Wen

(57) ABSTRACT

An optical transceiver module includes an optical-to-electrical converter configured to convert a first optical signal to a first electric signal, a first amplifier configured to amplify the first electric signal, a bandwidth controller coupled to the first amplifier, configured to control the frequency response characteristics of the amplification of the first amplifier to produce a first amplified electric signal, a driver circuit configured to receive a second electric signal and to produce a second amplified electric signal in response to the second electric signal and an optical feedback signal, an electrical-to-optical converter coupled to the micro-controller and configured to convert the second amplified electrical signal to a second optical signal, and a photo diode configured to detect the second optical signal and to produce the optical feedback signal to be received by the driver circuit.

12 Claims, 5 Drawing Sheets

MULTI-DATA-RATE OPTICAL TRANSCEIVER

CROSS-REFERENCES TO RELATED INVENTIONS

The present invention is related to commonly assigned U.S. patent application Ser. No. 10/741,805, filed on Dec. 19, 2003, titled "Bi-directional optical transceiver module having automatic-restoring unlocking mechanism", commonly assigned U.S. patent application Ser. No. 10/815,326, filed on Apr. 1, 2004, titled "Small form factor pluggable optical transceiver module having automatic-restoring unlocking mechanism and mechanism for locating optical transceiver components", commonly assigned U.S. patent application Ser. No. 10/850,216, filed on May 20, 2004, titled "Optical Transceiver module having improved printed circuit board", commonly assigned U.S. patent application Ser. No. 10/893,803, filed on Jul. 19, 2004, titled "Single fiber optical transceiver module", and commonly assigned Chinese Patent Application No. 200420034040.X filed on Jun. 15, 2004, titled "An APD Bias Voltage Test Equipment". The disclosures of these related applications are incorporated herein by reference.

TECHNICAL FIELD

This disclosure relates to electro-optical devices, specifically, an optical transceiver.

BACKGROUND

An optical transceiver is a device that can covert optical signals into electrical signals and convert electrical signals into optical signals. Various standards in the telecommunication and data communication industries specify the rates of data transmissions. For example, the original Ethernet standard has a data rate of 10 Megabit per second (Mbps). Fast Ethernet's data rate is 100 Mbps, and Gigabit Ethernet transmits and receives data at a rate of 1000 Mbps. Compliance with the standards is important for inter-operatability between different vendors for a wide range of commercial applications. Different industry standards such as the IEEE standard include requirements on the optical interface of an optical transceiver. Particularly, the average output power of an optical transceiver for the 100 Mbps Ethernet is between −20 and −15 dBm, while that for the 1000 Mbps Ethernet is between −10 and −4 dBm. Similarly, the required average input power for 100 Mbps Ethernet is from −30 dBm to −15 dBm while that for 1000 Mbps Ethernet is from −17 dBm to −3 dBm. The currently commercially available optical transceivers interface include only fixed data rate under a fixed optical specification. There is therefore a need for networks operating at different data rates to properly communicate with each other. There is also a need for networks to upgrade to higher data rates without excessive costs and time.

SUMMARY

In one aspect, the present invention relates to an optical transceiver module, comprising an optical-to-electrical converter configured to convert a first optical signal to a first electric signal; a first amplifier configured to amplify the first electric signal; a bandwidth controller coupled to the first amplifier, configured to control the frequency response characteristics of the amplification of the first amplifier to produce a first amplified electric signal; a driver circuit configured to receive a second electric signal and to produce a second amplified electric signal in response to the second electric signal and an optical feedback signal; an electrical-to-optical converter coupled to the micro-controller and configured to convert the second amplified electrical signal to a second optical signal; and a photo diode configured to detect the second optical signal and to produce the optical feedback signal to be received by the driver circuit.

In another aspect, the present invention relates to an optical transceiver module, comprising an optical-to-electrical converter configured to convert a first optical signal to a first electric signal; a first amplifier configured to amplify the first electric signal; a bandwidth controller coupled to the first amplifier, configured to control the frequency response characteristics of the amplification of the first amplifier to produce an first amplified electric signal; a driver circuit configured to receive a second electric signal and to produce an amplified electric signal in response to the second electric signal and a optical feedback signal; an electrical-to-optical converter coupled to the micro-controller and configured to convert the amplified electrical signal to a second optical signal; an optical data-rate detector configured to detect the second optical signal and to produce the optical feedback signal to be received by the driver circuit; an optical interface configured to receive the first optical signal and output the second optical signal; and an electrical interface configured to receive the second electrical signal and output the first amplified electrical signal.

In yet another aspect, the present invention relates to an optical transceiver module, comprising an optical-to-electrical converter configured to convert a first optical signal to a first electric signal; a first amplifier configured to amplify the first electric signal; a bandwidth controller coupled to the first amplifier, configured to control the frequency response characteristics of the amplification of the first amplifier to produce an first amplified electric signal; a driver circuit configured to receive a second electric signal and to produce an amplified electric signal in response to the second electric signal and a optical feedback signal; an electrical-to-optical converter coupled to the micro-controller and configured to convert the amplified electrical signal to a second optical signal; an optical data-rate detector configured to detect the second optical signal and to produce the optical feedback signal to be received by the driver circuit; an optical interface configured to receive the first optical signal and output the second optical signal; and an electrical interface configured to receive the second electrical signal and output the first amplified electrical signal.

Embodiments may include one or more of the following advantages. The disclosed system provides a flexible multi-rate optical transceiver that enables a computer network to operate at different data rates.

Another advantage of the disclosed system that it allows networks or computer devices operating at different data rates to communicate with each other.

Yet another advantage of the disclosed system that it provides convenient means for upgrading a network or computer system from one data rate to a different data rate. The manual unplugging and plugging of optical transceivers on a network are eliminated during a data rate upgrade.

Still another advantage of the disclosed system that the multi-rate optical transceiver is more cost efficient by providing the capability of communicating at multiple data rates in one optical transceiver.

Another advantage of the disclosed system that it provides software control of an optical interface to allow data transmission at different data rates and compatible with communication standards at the different data rates.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of conventional skill in the art that the present invention may be practiced without these specific details. In other instances, well known methods, procedures, components, and circuits have not been described in detail as not to unnecessarily obscure aspects of the present invention.

Figure 1:
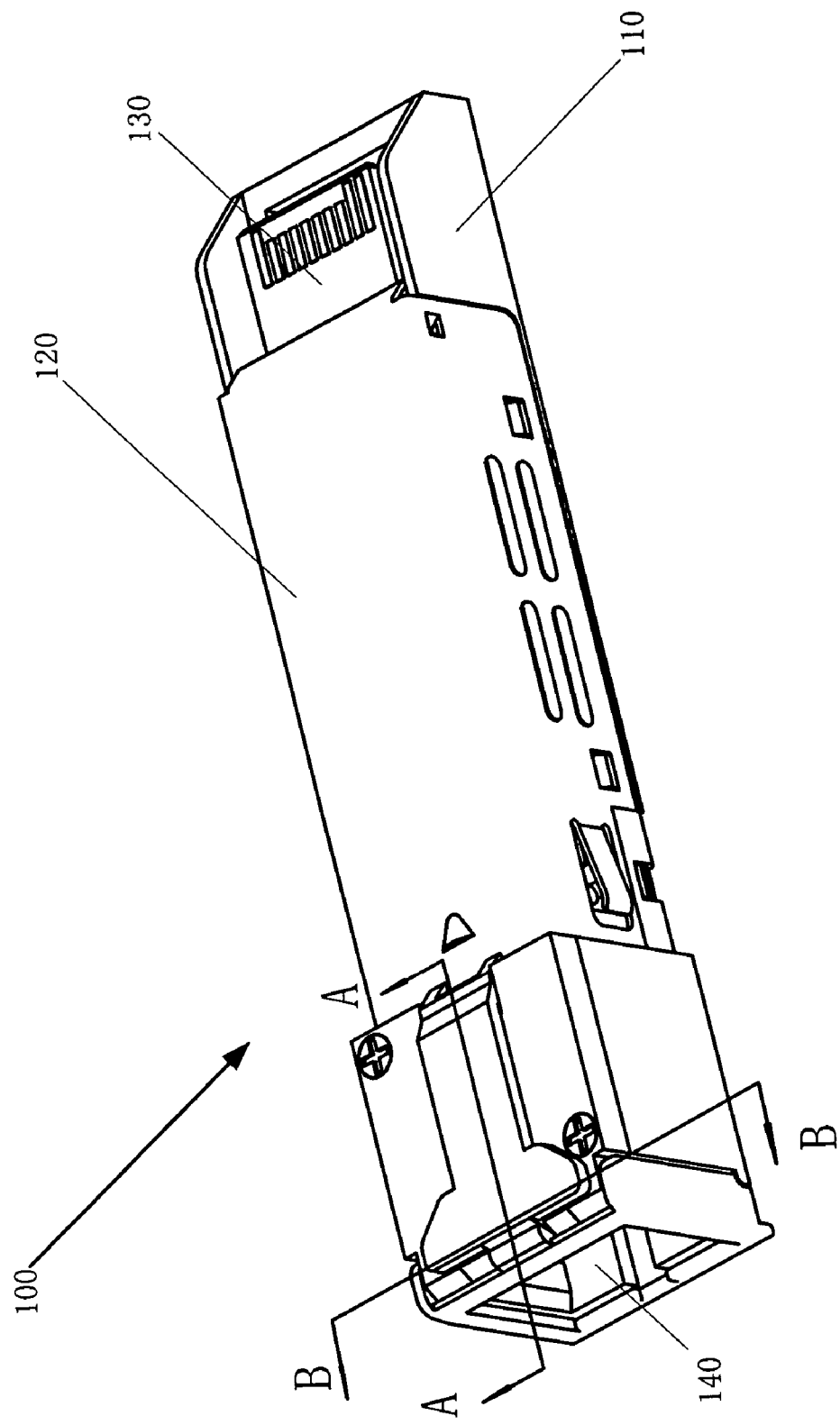
FIG. 1 is a perspective view of an exemplified optical transceiver module in compatible with the present invention.

FIG. 1 shows an optical transceiver 100 that can receive optical signals from an optical fiber and coverts the received optical signals into electrical signals. The optical transceiver 100 can also convert electrical signals into optical signals and transmits the converted optical signals to an optical fiber. The optical transceiver 100 include an electrical to optical converter (for transmit purposes), and an optical-to-electrical converter (for receive purposes), a driver providing proper bias voltage and modulation for transmission the output optical signals, and a limiting amplifier providing proper signal amplification for the optical-to-electrical converter.

Figure 2:
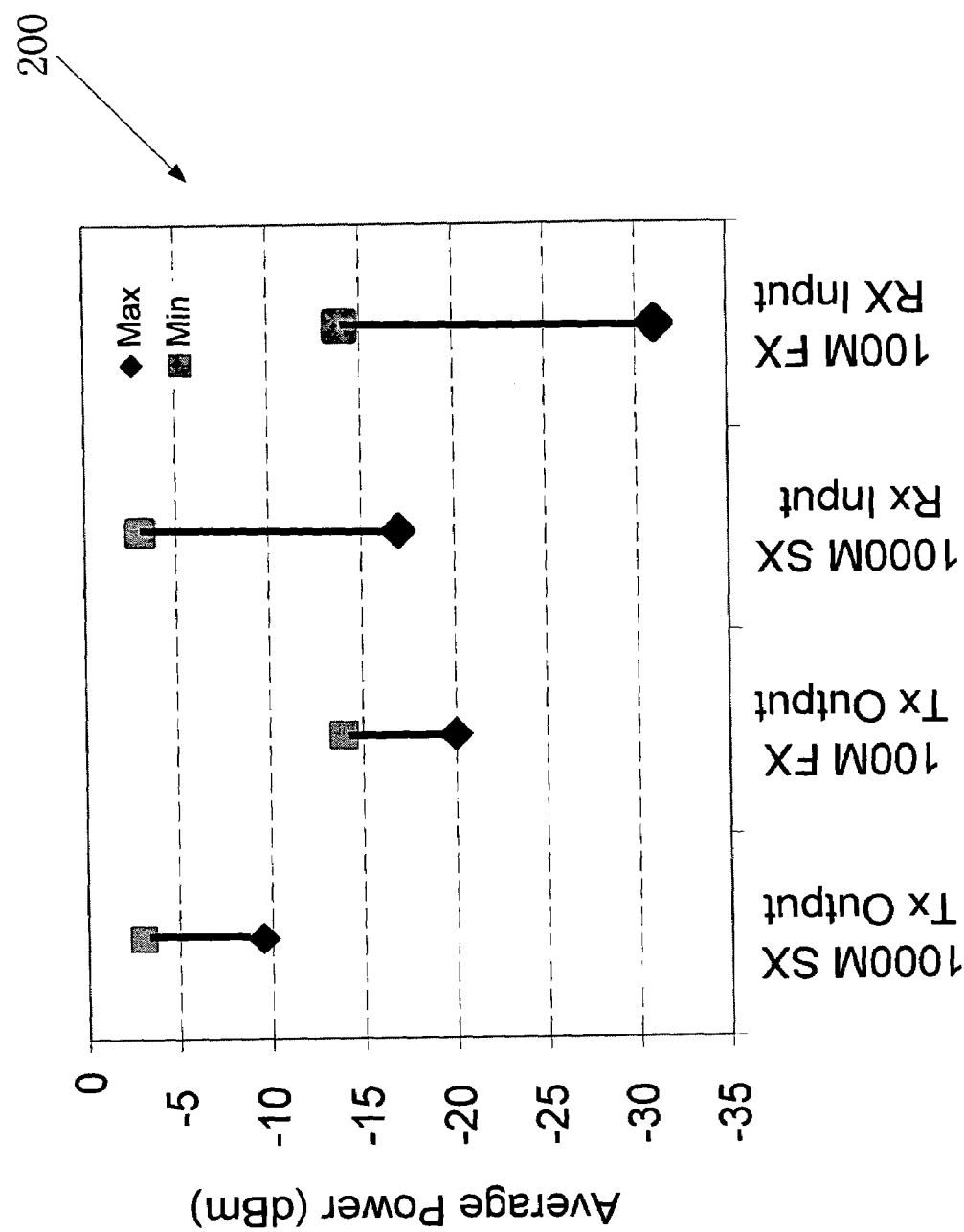
FIG. 2 is a chart for average power input and output for 100 Mbps and 1000 Mbps Ethernet in accordance with the present invention.

It is desirable for an optical transceiver to be in compliance with industry standards. The different industry standards have define requirements on the optical interface and the electric interface of an optical transceiver. In particular, different industry standards require different input and output powers to and from an optical transceiver. FIG. 2 shows an example of the average input and output power requirements for 100 Mbps and 1000 Mbps Ethernets.

A conventional optical transceiver is built to transmit and receive data at a fixed data rate. An optical transceiver for 100 Mbps Ethernet cannot be used on a 1000 Mbps Ethernet network. However, it is very common that a server and its clients work at different data rates (a server working at 1000 Mbps and some of its clients working at 100 Mbps while its other clients working at 1000 Mbps for example). In this situation, the server needs to be connected with a plurality of optical transceivers that each operates at a different data rate. Furthermore, when a communication device needs to be upgraded from one data rate (e.g. 100 Mbps) to another data rate (e.g. 1000 Mbps), all the old optical transceivers have to be replaced by new optical transceivers capable of transmitting data at the new data rate. The upgrade can thus be costly and time consuming.

For an optical transceiver to operate on multiple data rates, it is desirable to be able to transmit and receive data at multiple data rates at both its electrical interface and its optical interface. The industry standard interfaces for the electrical interface side include for example the Media Independent Interface (MII) and the Gigabit Media Independent Interface (GMII).

On the optical interface side, there has not been a standard solution. The fundamental requirement for a multi-rate optical transceiver is to enable the transceiver to transmit and receive optical signals using a variable input power and a variable output power that satisfy the requirements from various industry standards. In particular, the electrical-to-optical converter needs to output optical signals at a variable output power. The optical-to-electrical converter needs to operate at different sensitivities, in reflect of different input powers for different data rates.

Figure 3:
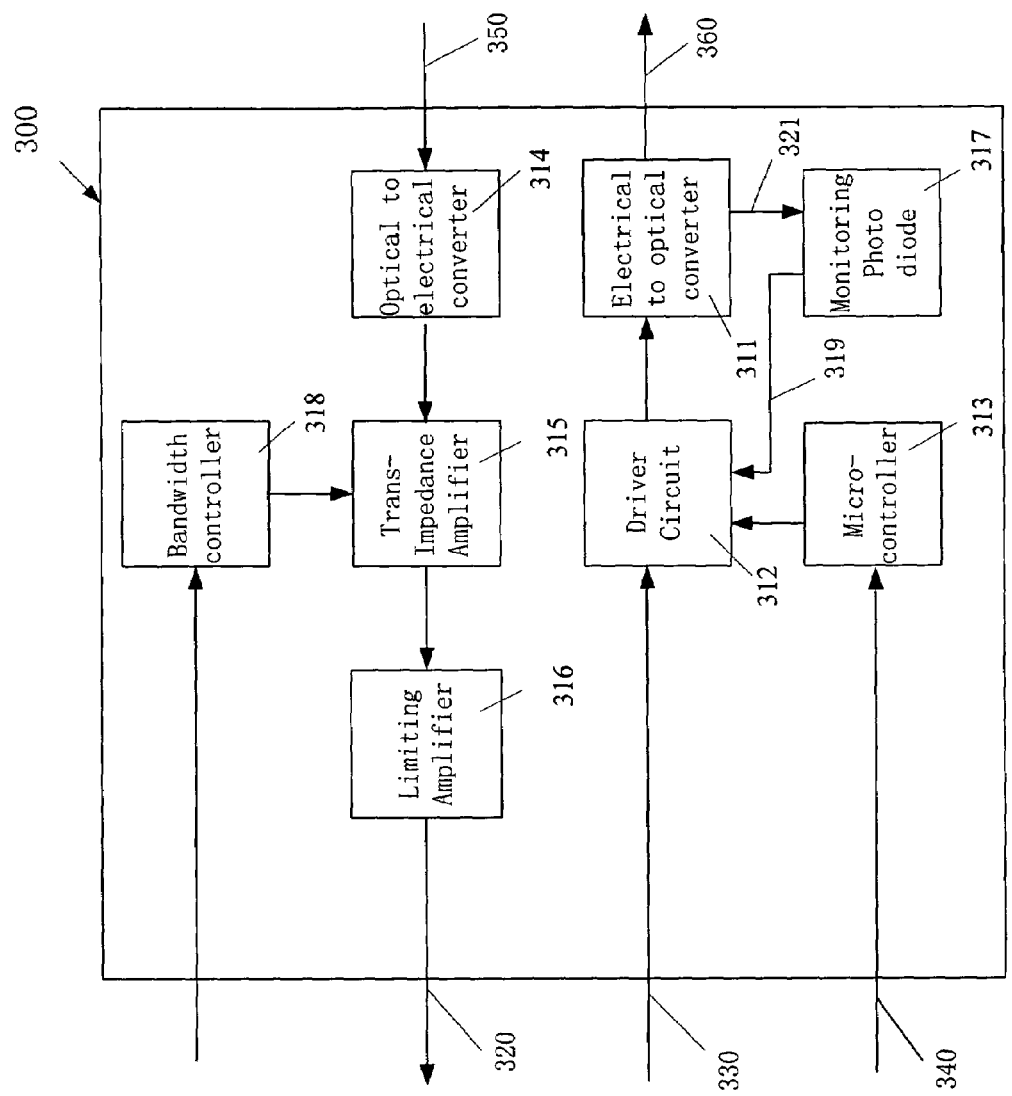
FIG. 3 is a block diagram for a multi-rate optical transceiver in accordance with an embodiment of the present invention.

Refer to FIG. 3, a block diagram illustrating the transmission and reception paths of an optical transceiver. In the transmission path, the optical transceiver 300 receives a second electrical signal 330 (also referred to as an electrical transmission signal). The electrical transmission signal 330 goes through block 312, which generates a driver current for electrical to optical converter 311. Block 312 also generates a bias voltage for the electrical to optical converter 311. The driver current and the bias voltage are controlled by micro-controller 313. The electrical to optical converter 311 generates a second optical signal 360 (also referred to as an optical transmission signal). The optical transmission signal 360 is monitored by monitoring photo-diode 317, which sends a feedback signal through feedback control line 319 to driver 312, so that the bias voltage and driving current can be modified. When there is a change in data rate at the electrical transmission signal 330, the data rate of the optical transmission output signal 360 can be changed by a user command line 340. Through the user command line 340, a control signal is sent to micro-controller 313. The micro-controller 313 controls the driver 312 that produces bias voltage and driving current for electrical to optical converter 311. Different bias voltages and driving currents can cause the electrical to optical converter 311 to produce different output power for the optical transmission signal 360.

The output power of the optical output signal 360 can be further controlled by a optical feedback signal through the feedback control line 319. A monitoring photo diode 317 receives and monitors the intensity of the monitoring optical signal 321 from the electrical to optical converter 311 and produces the feedback control signal in accordance with the intensity of the monitoring optical signal 321. The feedback signal can adjust the bias voltage or driving current of block 312 to control the output power of the optical transmission signal 360.

In the reception path, the optical transceiver 300 takes a first optical signal (i.e. the optical reception signal) 350, and the optical reception signal 350 is converted to a first electrical signal (i.e. the reception electrical signal) at optical-to-electrical converter 314. The converted electrical signal is amplified by Trans-Impedance Amplifier (TIA) 315, followed by a limiting amplifier 316. The amplification can be modified by TIA bandwidth controller 318.

When there is a change in the data rate in the optical reception signal 350, the sensitivity for the optical reception signal 350 needs to be modified to fit the reception data rate. This is done by the bandwidth controller user command input 370. This control signal is received by bandwidth controller 318, which controls the bandwidth of the Trans-Impedance Amplifier 315. Different bandwidth at the TIA 315 makes the sensitivity of the electrical signal from the optical-to-electrical converter 314 different. Thus the optical transceiver 300 can be adjusted to receive data at different data rates.

A variety of implementations exist for the control lines 340 and 370. Control lines 340 and 370 can be a single control that can set data transmission and reception at the same data rate. Alternatively, the control lines 340 and 370 can be implemented by two separate control lines, allowing different data rates for data transmission and reception. In one implementation of the control lines 340 and 370, the control lines simply send a "mode" signal, informing the optical transceiver the desired data rate to be set. Once the mode signal is received, the optical transceiver is programmed to automatically set the operation parameters to a set of pre-determined values such that the proper data rate can be achieved. The "mode" signals can be prepared and stored in one of the following forms:

1. a programmable logic such as CPLD or FPGA
2. a memory device, such as EEPROM
3. a micro-controller (with build in memory to store software instruction)

In another implementation of the control lines 340 and 370, the controls are achieved through an "in-band" handshaking from the optical interface. The operation mode of the optical transceiver is determined through this hand shake optical interface, by an intelligent data processing unit so that the optical transceiver can be set at the proper data rate through the "remote" provisioning by the link party at the far side.

Figure 4:
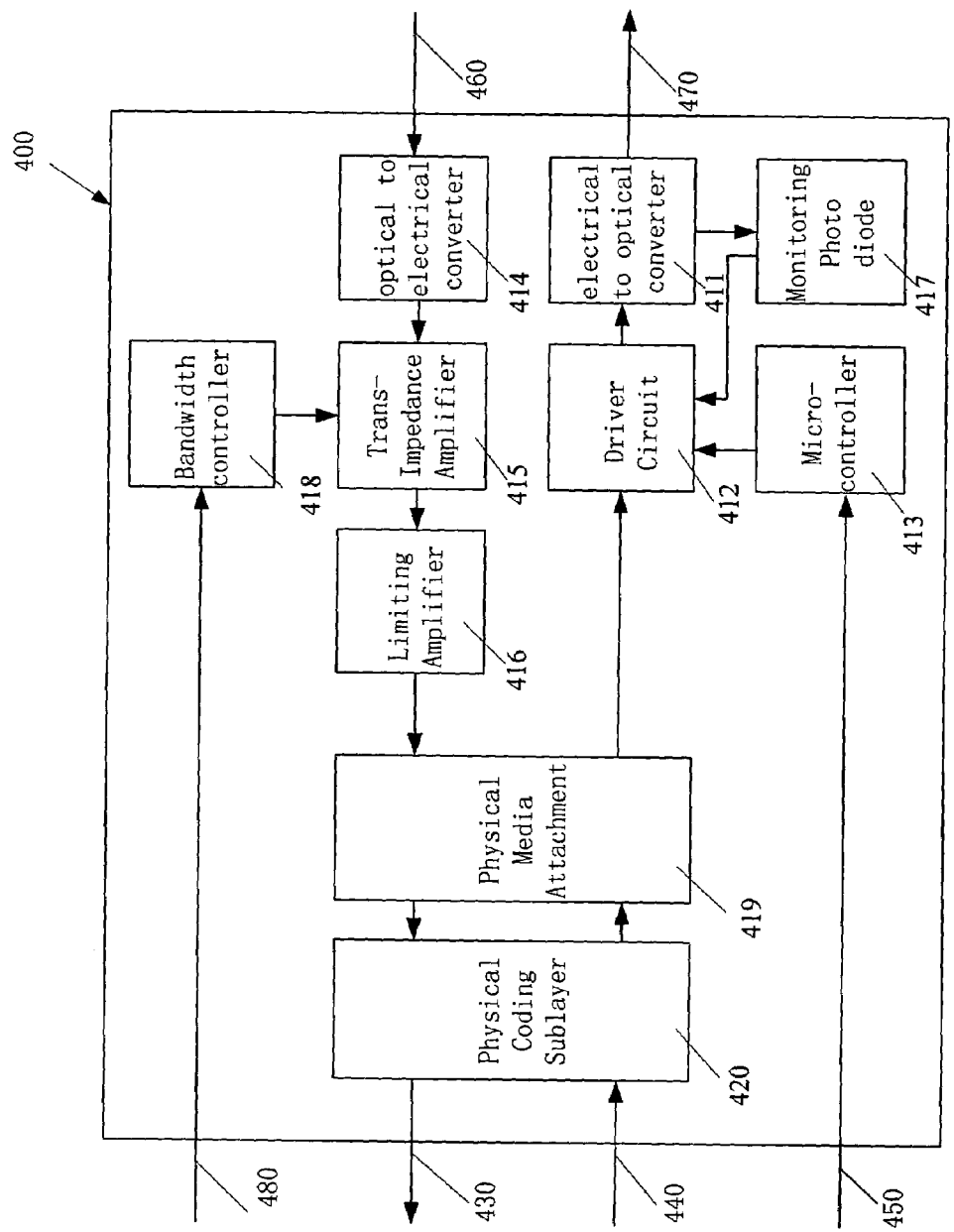
FIG. 4 is a block diagram for a multi-rate optical transceiver with an electrical Media Independent Interface in accordance with another embodiment of the present invention.

FIG. 4 illustrates another optical transceiver 400. In the transmission path, the optical transceiver 400 receives an electrical transmission signal at a Physical Coding Sublayer (PCS) block 420 which in turn transmits the electrical transmission signal to a Physical Media Attachment (PMA) block 419. The electrical transmission signal from the PMA block 419 goes through block 412, which generates a driver current for electrical to optical converter 411. Block 412 also generates a bias voltage for the electrical to optical converter 411. The driver current and the bias voltage are controlled by micro-controller 413. The electrical to optical converter 411 generates an optical transmission signal 470. The optical transmission signal 470 is monitored by monitoring photo-diode 417, which sends a feedback signal through feedback control line 490 to driver 412, so that the bias voltage and driving current can be modified.

When there is a change in data rate at the electrical transmission signal 430, the data rate of the optical transmission output signal 470 can be changed by a user command line 450. Through the user command line 450, a control signal is sent to micro-controller 413, which controls the driver 412 which in turn produces the bias voltage and driving current for electrical to optical converter 411. Different bias voltages and driving currents cause the electrical to optical converter 411 to produce different output power for the optical transmission signal 470.

The output power of the optical output signal 470 can be further regulated by setting different values to an EEPROM POT in the control feedback loop by the optical feedback signal through the feedback control line 490, which is generated by monitoring photo diode 417. The monitoring photo diode 417 receives and monitors the strength of a monitoring optical signal 421 from the electrical to optical converter 411. Based on the strength of the monitoring optical signal 421, the monitoring photo-diode 417 produces the feedback control signal on the feedback control line 490. The feedback signal reduces or increases the bias voltage or driving current of block 412, which results in a reduction or increase in the output power of the optical transmission signal 470.

In the reception path, the optical transceiver 400 receives an optical reception signal 460, and the optical reception signal 460 is converted to a reception electrical signal at optical-to-electrical converter 414. The converted electrical reception signal is amplified by Trans-Impedance Amplifier (TIA) 415, followed by a limiting amplifier 416. The amplification can be modified by TIA bandwidth controller 418.

When there is a change in the data rate in the optical reception signal 460, the for the optical reception signal 460 is modified to fit the reception data rate by adjusting controller user command input 470 to the bandwidth controller. Based on the user command input 470, the bandwidth of the Trans-Impedance Amplifier 315 modifies the bandwidth of ITA 415. Different bandwidths at the TIA 415 can result in different sensitivities to the electrical signal in the optical-to-electrical converter 414. Thus the optical transceiver 400 can be adjusted to receive data at different data rates.

The PMA 419 and PCS 420 are electric circuits that enable in the compatibility with the Ethernet standards such as the Media Independent Interface (MII) standard or the Gigabit Media Independent Interface (GMII). With the configuration in FIG. 4, the interface of signals 430 and 440 become "universal" with any GMII (Gigabit Media Independent Interface) type of interfaces. With a GMII interface, data can be transmitted at different data rate such as 100 Mbps or Gigabit Ethernet through the same interface without any need for changing the physical optical interface device. This is achieved by integrating the intelligence of switching the operation mode of PHY also inside the transceiver. Data Encoding and Decoding can be conducted without any physical change. For example 100M Ethernet requires 4B/5B CODEC while Gigabit Ethernet requires 8B/10B CODEC. With this "switchable" function integrated into the optical transceiver, it becomes a "universal device" for running both Fast Ethernet and Gigabit Ethernet. A user can attach this device to their MII or GMII based MAC interface and set data rate by software commands without changing the physical configuration of the device.

Figure 5:
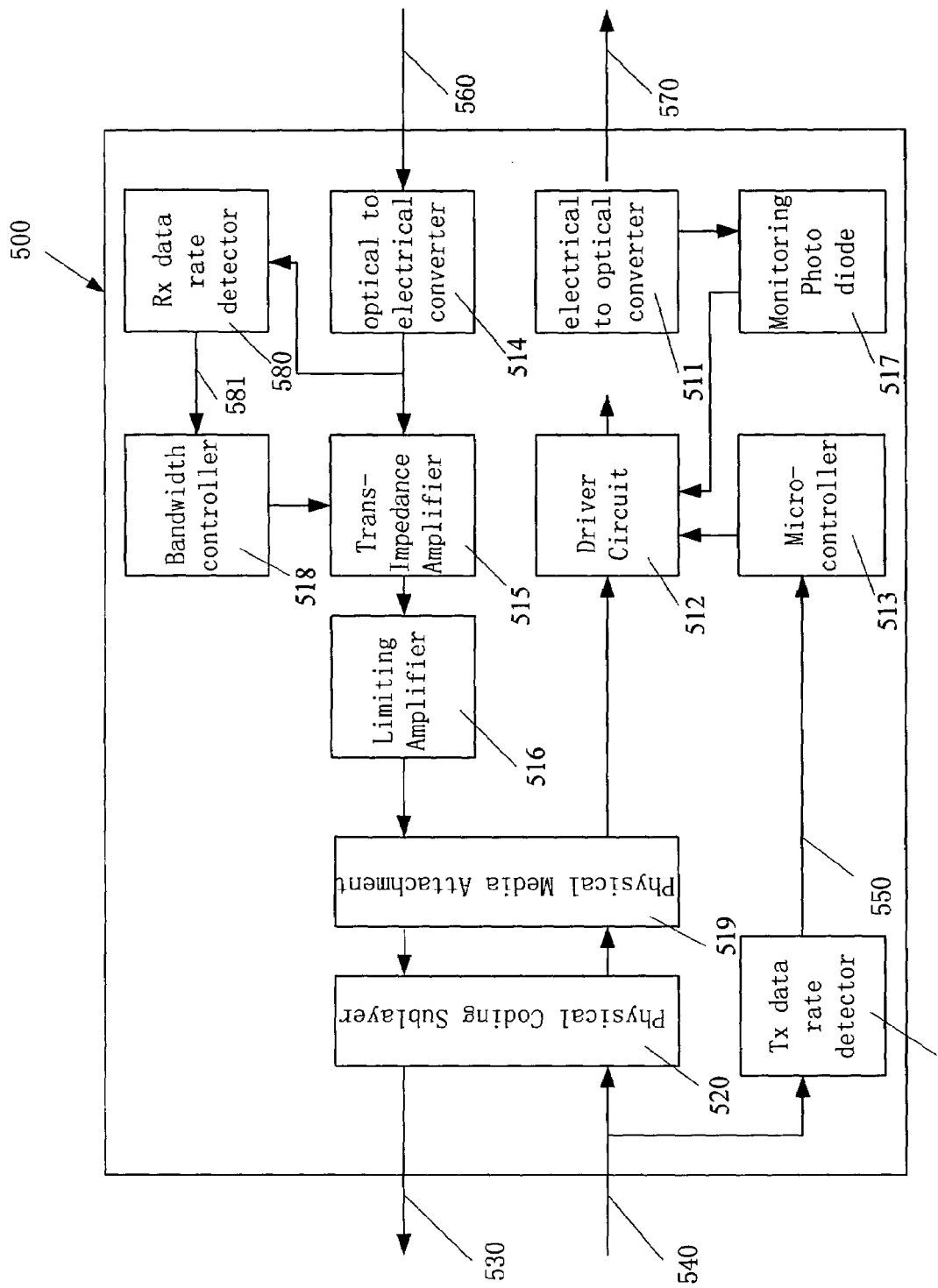
FIG. 5 is a block diagram for a multi-rate optical transceiver with automatic data rate detection in accordance with another embodiment of the present invention.

In another embodiment, the optical transceiver's transmission and reception data rates can be detected and the optical transceiver's operation mode can be set automatically based on the detected transmit and reception data rates. FIG. 5 shows the block diagram for an optical transceiver 500. As optical transceiver 400, optical transceiver 500 has a Physical Coding Sublayer (PCS) block 520 at its electrical interface. At this interface, electrical transmission signal 540 enters the PCS 520 and electrical reception signal 530 is sent out by the PCS 520. The PCS 520 is coupled with a Physical Media Attachment (PMA) block 519. The combination of the PCS 520 and the PMA 519 makes the electrical interface a standard Ethernet interface making it possible for the optical transceiver to be connected directly to an Ethernet Media Access Controller (MAC) block.

On the optical interface, the optical transmission signal 570 is the output from the electrical-to-optical converter 511. The optical reception signal 560 enters the optical-to-electrical converter 514. The major control of the output power of optical transmission signal 570 is from control input 550, and a fine tune control signal 590 comes from monitoring photo-diode 517. The control of the input sensitivity of optical reception signal 560 is through bandwidth controller 518, which is controlled by control signal 581. Unlike ptical transceiver 400, whose data rate is entirely controlled by user command lines, optical transceiver 500 can detect the data rates at the electrical transmission signal 540 and the reception optical signal 560.

In the transmission direction, the transmission data rate detector 521 detects the electrical transmission signal 540 and measures the transmission signal data rate. One possible implementation of the data rate detector 521 can comprise a clock recovery circuit and a counter. The counter of clock cycles is an indication of the data rate. Based on the measured transmission signal data rate, the transmission data rate detector 521 generates a Micro-controller data rate set up input signal 550 and sends this control signal to micro-controller 513.

In the data-reception path, the reception data rate detector 580 receives the electrical reception signal from output of the optical-to-electrical converter 514 and measures the data rate of this signal. Based on the measured data rate of the input optical data, the reception data rate detector 580 generates a bandwidth controller set up input 581, and sends this control signal to bandwidth controller 518. With the detection of the transmission and reception data rates, the data rates of the optical transceiver 500 can be automatically set by the data rate detectors 521 and 580, thus the user command lines can be eliminated.

The disclosed system includes the following advantages over the conventional single-data-rate optical transceiver: (1) A multi-rate optical transceiver makes it possible to a network to operate at different data rates or for networks or computer devices operating at different data rates to communicate with each other. (2) A multi-rate optical transceiver makes it more convenient to upgrade a network from one data rate to a higher data rate. No unplugging and plugging of optical transceivers on a network is needed during a data rate upgrade. (3) A multi-rate optical transceiver is more cost efficient. The multi-rate optical transceiver can operate on multiple data rates, while several conventional single-data-rate optical transceivers are required to operate at different data rates.

PART NUMBERS 100 optical transceiver module
110 module housing
120 shielding metal cover
130 electrical interface
140 optical interface
200 a chart for average input and output powers of 100 Mbps and 1000 Mbps Ethernet
311 Electrical to optical converter device
312 driver circuits
313 micro-controller/EEPOT
314 optical-to-electrical converter
315 trans-impedance amplifier
316 limiting amplifier
317 monitoring photo-diode
318 trans-impedance amplifier bandwidth control
319 feedback control line
320 electrical signal output
321 monitoring optical signal
330 electrical signal input
340 micro-controller user command input
350 optical signal input
360 optical signal output
370 bandwidth controller user command input
411 electrical to optical converter device
412 driver circuits
413 micro-controller/EEPOT
414 optical-to-electrical converter
415 trans-impedance amplifier
416 limiting amplifier
417 Monitoring photo-diode
418 Trans-impedance amplifier bandwidth control
419 Physical Media Attachment (PMA)
420 Physical Coding Sublayer (PCS)
430 Media Independent Interface (MII) electrical signal output
440 Media Independent Interface (MII) electrical signal input
450 Micro-controller user command input line
460 Optical signal input
470 optical signal output
480 bandwidth controller user command input
511 electrical to optical converter device
512 driver circuits
513 micro-controller/EEPOT
514 optical-to-electrical converter
515 trans-impedance amplifier
516 limiting amplifier
517 monitoring photo-diode
518 trans-impedance amplifier bandwidth control
519 Physical Media Attachment (PMA)
520 Physical Coding Sublayer (PCS)
521 Rx data rate detector
530 Media Dependent Interface electrical signal output
540 Media Dependent Interface electrical signal input
550 Micro-controller data rate set up input
560 optical signal input
570 optical signal output
580 Tx data rate detector
581 Bandwidth controller set up input

What is claimed is:

1. An optical transceiver module, comprising
an optical-to-electrical converter configured to convert a first optical signal to a first electric signal;
a first amplifier configured to amplify the first electric signal;
a bandwidth controller coupled to the first amplifier, configured to control the frequency response characteristics of the amplification of the first amplifier to produce a first amplified electric signal;
a driver circuit configured to receive a second electric signal and to produce a second amplified electric signal in response to the second electric signal and an optical feedback signal;
an electrical-to-optical converter configured to convert the second amplified electrical signal to a second optical signal; and
a photo diode configured to detect the second optical signal and to produce the optical feedback signal to be received by the driver circuit, and
an electrical interface configured to receive the second electrical signal and output the first amplified electrical signal, wherein the electrical interface comprises a Physical Media Attachment block (PMA) coupled to the first amplifier and the driver circuit, and configured to receive the first amplified electrical signal from the first amplifier and to transmit the second electrical signal to the driver circuit.

2. The optical transceiver module in claim 1, further comprising:
a second user command interface configured to receive a second bandwidth control signal; and
a micro-controller coupled to the driver circuit, configured to control the, bias voltage and driving current of the driver circuit in response to the bandwidth control signal.

3. The optical transceiver module in claim 2, wherein the driver circuit can amplify the second electric signal in selective frequency ranges to produce the amplified electric signal in response to the second electric signal and the optical feedback signal.

4. The optical transceiver module in claim 1, wherein the photo diode is configured to measure the power of the second optical signal to produce the optical feedback signal to be received by the driver circuit.

5. The optical transceiver module in claim 1, further comprising:
a first user command interface coupled to the bandwidth controller, configured to transmit a bandwidth control signal to the bandwidth controller.

6. The optical transceiver module in claim 5, wherein the first amplifier can selectively amplify the first electric signal in a frequency range in response to the bandwidth control signal.

7. The optical transceiver module in claim 1, further comprising:
an optical interface configured to receive the first optical signal and output the second optical signal.

8. The optical transceiver module in claim 7, wherein the optical interface is in compliance with the Small Form-factor Pluggable.

9. The optical transceiver module in claim 1, wherein the electrical interface comprises a Physical Coding Sublayer block (PCS) coupled to the Physical Media Attachment block (PMA), and configured to receive the first amplified electrical signal from the Physical Media Attachment block and to transmit the second electrical signal to the Physical Media Attachment block.

10. The optical transceiver module in claim 1, wherein the electrical interface complies with the Media Independent Interface or the Gigabit Media independent Interface.

11. An optical transceiver module, comprising
an optical-to-electrical converter configured to convert a first optical signal to a first electric signal;
a first amplifier configured to amplify the first electric signal;
a bandwidth controller coupled to the first amplifier, configured to control the frequency response characteristics of the amplification of the first amplifier to produce an first amplified electric signal;
a driver circuit configured to receive a second electric signal and to produce an amplified electric signal in response to the second electric signal and a optical feedback signal;
an electrical-to-optical converter configured to convert the amplified electrical signal to a second optical signal;
a photo diode configured to detect the second optical signal and to produce the optical feedback signal to be received by the driver circuit;
a second user command interface configured to receive a second bandwidth control signal;
a micro-controller coupled to the driver circuit and the electrical-to-optical converter, wherein the micro-controller is configured to control the bias voltage and driving current of the driver circuit in response to the bandwidth control signal;
an optical interface configured to receive the first optical signal and output the second optical signal; and
an electrical interface configured to receive the second electrical signal and output the first amplified electrical signal, wherein the electrical interface includes
a Physical Media Attachment block (PMA) coupled to the first amplifier and the driver circuit, configured to receive the first amplified electrical signal from the first amplifier and transmits the second electrical signal to the driver circuit; and
a Physical Coding Sublayer block (PCS) coupled to the Physical Media Attachment block (PMA), configured to receive the first amplified electrical signal from the Physical Media Attachment block and transmits the second electrical signal to the Physical Media Attachment block.

12. The optical transceiver module in claim 11, further comprising:
a first user command interface coupled to the bandwidth controller, configured to transmit a bandwidth control signal to the bandwidth controller,
wherein the first amplifier can selectively amplify the first electric signal in a frequency range in response to the bandwidth control signal.

* * * * *